US011477931B2

(12) United States Patent
Hake et al.

(10) Patent No.: US 11,477,931 B2
(45) Date of Patent: Oct. 25, 2022

(54) TILLAGE IMPLEMENT

(71) Applicant: Great Plains Manufacturing, Inc., Salina, KS (US)

(72) Inventors: Rodney D. Hake, Tipton, KS (US); Michael J. Ohnsat, Tipton, KS (US); Tanner Peroutek, Tipton, KS (US)

(73) Assignee: Great Plains Manufacturing, Inc., Salina, TX (US)

( * ) Notice: Subject to any disclaimer, the term of this patent is extended or adjusted under 35 U.S.C. 154(b) by 293 days.

(21) Appl. No.: 16/843,456

(22) Filed: Apr. 8, 2020

(65) Prior Publication Data

US 2021/0315146 A1    Oct. 14, 2021

(51) Int. Cl.
| | |
|---|---|
| *A01B 63/00* | (2006.01) |
| *A01B 5/04* | (2006.01) |
| *A01B 15/18* | (2006.01) |
| *A01B 21/04* | (2006.01) |
| *A01B 29/04* | (2006.01) |
| *A01B 49/02* | (2006.01) |
| *A01B 73/00* | (2006.01) |

(52) U.S. Cl.
CPC ............. *A01B 63/004* (2013.01); *A01B 5/04* (2013.01); *A01B 15/18* (2013.01); *A01B 21/04* (2013.01); *A01B 29/048* (2013.01); *A01B 49/027* (2013.01); *A01B 73/00* (2013.01)

(58) Field of Classification Search
CPC ......... A01B 63/004; A01B 5/04; A01B 15/18; A01B 21/04; A01B 29/048; A01B 49/027; A01B 73/00
See application file for complete search history.

(56) References Cited

U.S. PATENT DOCUMENTS

| | | |
|---|---|---|
| 6,554,078 B1 | 4/2003 | McDonald |
| 2004/0149459 A1 | 8/2004 | Powell et al. |
| 2006/0021769 A1 | 2/2006 | Ankenman et al. |
| (Continued) | | |

OTHER PUBLICATIONS

Search Report and Written Opinion dated Mar. 26, 2021 for related PCT Patent Application No. PCT/US2020/064775, 11 pages.

(Continued)

*Primary Examiner* — Tara Mayo-Pinnock
(74) *Attorney, Agent, or Firm* — Hovey Williams LLP; Kameron D. Kelly

(57) ABSTRACT

A tillage implement comprising a main frame, a front group of coulter blades carried by the main frame and extending generally laterally, and a rear group of coulter blades carried by the main frame and extending generally laterally. The tillage implement additionally comprises a set of wheels configured to support the main frame and positioned generally between the front and rear groups of coulter blades. The tillage implement additionally comprises a group of harrow assemblies carried by the main frame and positioned rearward of the rear group of coulter blades. The tillage implement additionally comprises a front group of finishing reels carried by the main frame, extending generally laterally, and positioned rearward of the group of harrow assemblies. Furthermore, the tillage implement comprises a rear group of finishing reels carried by the main frame, extending generally laterally, and positioned rearward of the front group of finishing reels.

26 Claims, 7 Drawing Sheets

(56) References Cited

U.S. PATENT DOCUMENTS

| | | |
|---|---|---|
| 2010/0084148 A1* | 4/2010 | Kovach et al. ........ A01B 21/08 |
| | | 172/145 |
| 2012/0227991 A1 | 9/2012 | Hake et al. |
| 2015/0021059 A1 | 1/2015 | Hennes |
| 2015/0101834 A1 | 4/2015 | Way |
| 2016/0262300 A1 | 9/2016 | Gates |
| 2017/0049038 A1 | 2/2017 | Hilvers et al. |
| 2018/0199497 A1 | 7/2018 | Roberge et al. |
| 2019/0000002 A1 | 1/2019 | Steinlage et al. |
| 2020/0107490 A1* | 4/2020 | Zemenchik ........... A01B 63/111 |
| 2020/0128719 A1* | 4/2020 | Harmon ................. A01B 15/16 |
| 2020/0221627 A1* | 7/2020 | Kovach et al. ...... A01B 63/008 |

OTHER PUBLICATIONS

Kuhn Excelerator 8005; https://www.kuhn-usa.com/crop/tillage-tools/high-speed-vertical-tillage/excelerator-8005; Kuhn North America, Inc; 6 pages.

John Deere 2660VT Variable Intensity Tillage; https://www.deere.com/en/tillage/disks/2660vt-variable-intensity-tillage/; Deer & Company 2020; 2 pages.

* cited by examiner

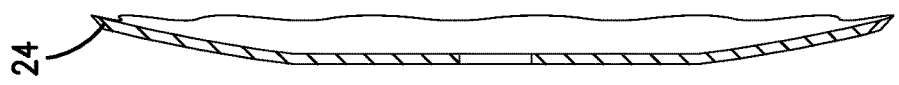
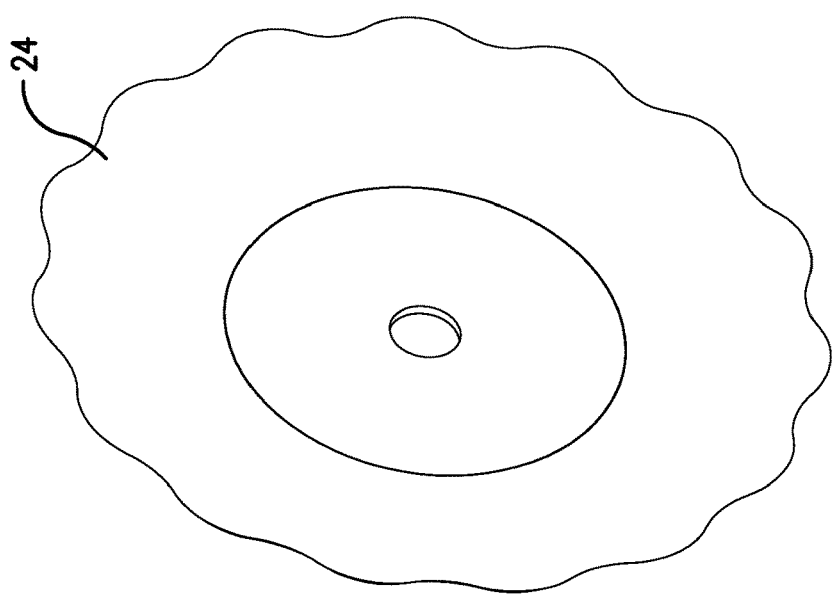
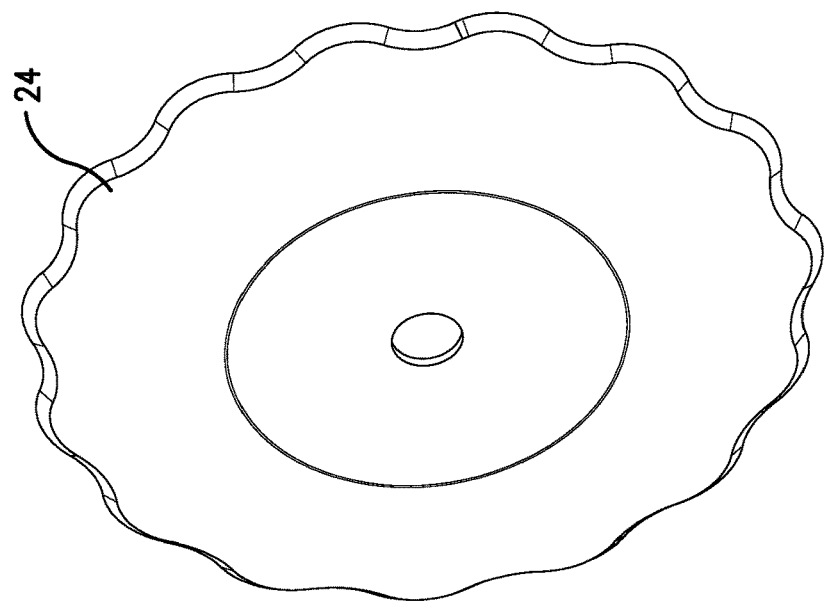

TILLAGE IMPLEMENT

FIELD OF THE INVENTION

The present invention relates to agricultural implements. More particularly, embodiments of the present invention relate to tillage implements that utilize ground-engaging tools to carry out tilling operations.

BACKGROUND OF THE INVENTION

The use of tillage implements for carrying out tilling operations (e.g., vertical tillage or residue management) has grown in popularity in recent years. Vertical tillage implements have typically employed laterally-extending gangs of coulter blades that are disposed in straight-ahead, parallel alignment with the travel direction of the implements. Such laterally-extending gangs may be preferably used for seed bed preparation work. In some instances, the coulter blades may be provided with lateral projections such as waves or flutes to make them more aggressive as they cut through surface residue and engage, fracture, and lift the soil. Generally speaking, however, it is not the objective of vertical tillage implements to turn over and move significant amounts of soil to the side of the coulter blades.

In contrast, separate more aggressive ground-engaging tools may be used in situations where significant soil displacement is desired. For example, gang angle tillage implements with gangs of coulter blades oriented such that the blades are disposed at oblique angles to the implements' direction of travel may be used to significantly displace soil. Such angled gangs may be preferably used in crop/plant residue management work. Thus, in the past, it has been necessary to have two separate machines to meet these two distinctly different needs, i.e., a vertical tillage implement for seed bed preparation work and a gang angle tillage implement for residue management work. In addition, in previously-used tillage implements, it has been difficult to incorporate and position multiple different types of ground-engaging tools onto the tillage implements to achieve desired mixing and leveling action of soil. In particular, the use of multiple different types of ground-engaging tools on a tillage implement can bring about an adverse negative tongue weight, which can be problematic for transportation, steering, and general operation of the tillage implement. Furthermore, most previously-used implements function to either (i) prepare a seedbed by finishing the soil (e.g., firming and/or levelling the soil), but did not bury residue or move enough soil laterally to smooth uneven surfaces, (ii) perform soil and residue management, but did not provide adequate finishing of the soil for a proper seedbed.

SUMMARY OF THE INVENTION

One embodiment of the present invention includes a tillage implement comprising a main frame, a front group of coulter blades carried by the main frame and extending generally laterally across the tillage implement, and a rear group of coulter blades carried by the main frame and extending generally laterally. The tillage implement additionally comprises a set of wheels configured to support the main frame on a ground surface. The set of wheels is positioned generally between the front and rear groups of coulter blades. The tillage implement additionally comprises a group of harrow assemblies carried by the main frame and positioned rearward of the rear group of coulter blades. The tillage implement additionally comprises a front group of finishing reels carried by the main frame, extending generally laterally, and positioned rearward of the group of harrow assemblies. Furthermore, the tillage implement comprises a rear group of finishing reels carried by the main frame, extending generally laterally, and positioned rearward of the front group of finishing reels.

In another embodiment of the present invention, there is provided a tillage implement comprising a main frame and a first gang of coulter blades carried by the main frame. The first gang of coulter blades is configured to rotate between a minimum gang angle and a maximum gang angle, with the minimum gang angle being less than two degrees and the maximum gang angle being at least seven degrees. The tillage implement additionally comprises a second gang of coulter blades carried by the main frame and configured to rotate between a minimum gang angle and a maximum gang angle, with the minimum gang angle being less than two degrees and the maximum gang angle being at least five degrees. The tillage implement additionally comprises a set of wheels configured to support the main frame on a ground surface. At least one of the wheels of the set of wheels is positioned rearward of the first gang of coulter blades and forward of the second gang of coulter blades. The tillage implement additionally comprises a set of rolling harrow assemblies carried by the main frame and positioned rearward of the second gang of coulter blades. The tillage implement further comprises a plurality of rear finishing reels carried by the main frame and positioned rearward of the set of rolling harrow assemblies.

In another embodiment of the present invention, there is provided a tillage implement comprising a main frame and a front gang of coulter blades carried by the main frame. The font gang of coulter blades is configured to rotate between minimum and maximum gang angles measured with respect to a lateral direction relative to said tillage implement. The tillage implement additionally comprises a set of wheels positioned generally behind the front gang of coulter blades and configured to support the main frame on a ground surface. The tillage implement additionally comprise a plurality of rolling harrow elements positioned generally behind the set of wheels, with each harrow element being angled by at least fifteen degrees with respect to the travel direction of the tillage implement. The tillage implement additionally comprises a front finishing reel carried by the main frame and positioned generally behind the plurality of rolling harrow elements. The tillage implement further comprises a rear finishing reel carried by the main frame and positioned generally behind the front finishing reel.

In another embodiment of the present invention, there is provided a method of tilling soil using a tillage implement. One step includes pulling the tillage implement through a section of soil in a travel direction. Another step includes cutting into the section of soil using a first gang of coulter blades positioned adjacent to a front end of the tillage implement. Another step includes cutting into the section of soil using a second gang of coulter blades. The second gang of coulter blades is positioned rearward of the first gang of coulter blades, and a set of wheels supporting the tillage implement on a ground surface is positioned rearward of the first gang of coulter blades and forward of the second gang of coulter blades. Another step includes mixing the section of soil using a set of rolling harrow assemblies positioned rearward of the second gang of coulter blades. Another step includes levelling the section of soil using a first set of finishing reels positioned rearward of the set of rolling harrow assemblies. A further step includes levelling the section of soil using a second set of finishing reels positioned rearward of the first set of finishing reels.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 7 is a front perspective view of a coulter blade used on the tillage implement from FIGS. 1 and 2;

FIG. 8 is a rear perspective view of the coulter blade from FIG. 7; and

FIG. 9 is a cross section of the coulter blade from FIGS. 7 and 8.

Figure 1:
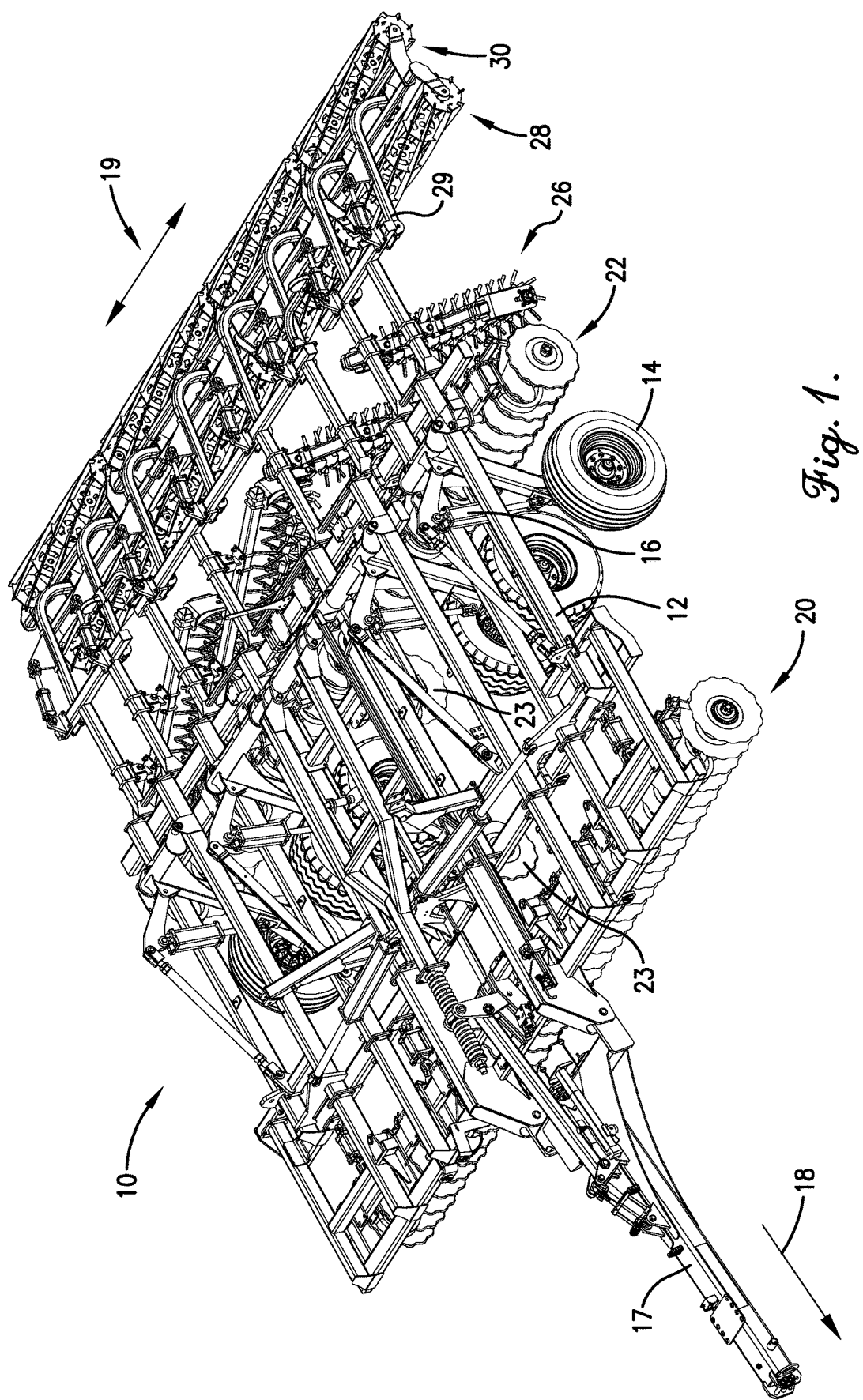
FIG. 1 is a front perspective view of a tillage implement according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
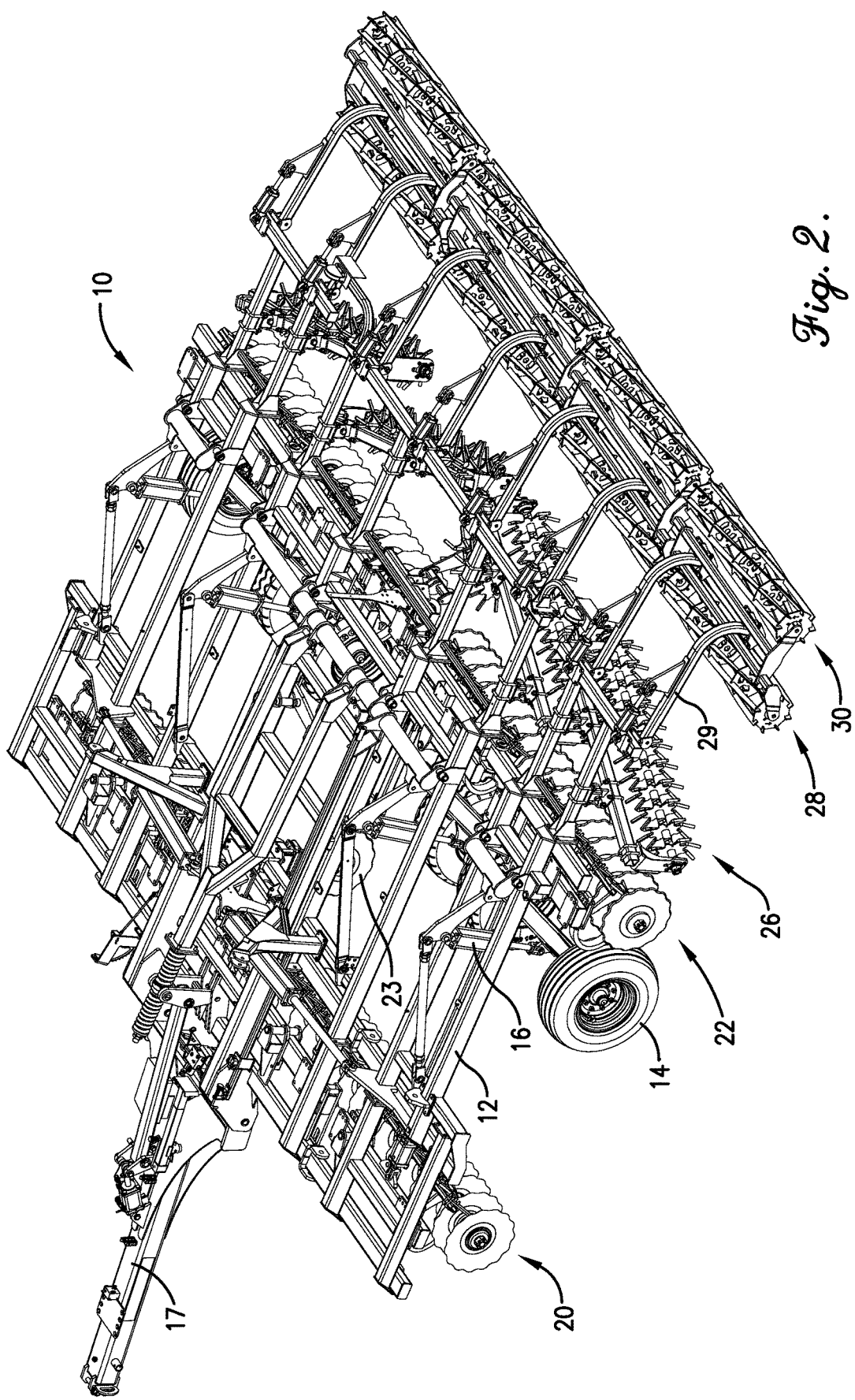
FIG. 2 is a rear perspective view of the tillage implement from FIG. 1.

Referring initially to FIGS. 1 and 2, a tillage implement 10 incorporating the principles of the present invention is illustrated. The implement 10 may be pulled across a field (which may include one or more sections of soil) to be tilled. The implement 10 may be pulled by a towing vehicle (not shown) such as a tractor. Broadly speaking, implement 10 comprises a main frame 12 supported above a ground surface by a plurality of wheels 14. The main frame 12 is configured to carry a plurality of ground-engaging tools, which will be described in more detail below. One or more of the wheels 14 may comprise depth-adjustment wheels configured to be adjustable up and down relative to main frame 12 by hydraulic actuators 16 for thereby controlling (i) the depth of soil penetration of the ground-engaging tools when the implement 10 is lowered to an operating configuration, and/or (ii) the height of the ground-engaging tools above the ground when the implement 10 is raised to a transport configuration.

Directional terms used in the following specification, such as the terms "front/forward," "back/rear/rearward," "left," and "right," are given from the viewpoint of one standing at the rear of the implement 10 looking forward. As such, for example, the implement 10 may include a hitch tongue 17 at a front of the implement 10, extending forward from the main frame 12, for coupling the implement 10 with the towing vehicle. Furthermore, the implement 10 will generally be configured for movement in a travel direction (as illustrated by the forward-facing arrow 18 on FIG. 1), as the implemented is propelled by a towing vehicle. As used herein, the term "longitudinal" will generally refer to a forward and/or rearward direction with respect to the implement 10. As such, the longitudinal direction is generally parallel with the travel direction. In contrast, the term "lateral" will generally refer to a rightward and/or leftward direction with respect to the implement 10. As such, the lateral direction is generally perpendicular with the travel direction. For example, the leftward/rightward facing arrows 19 shown on FIG. 1 are representative of a lateral direction with respect to the implement 10.

Figure 3:
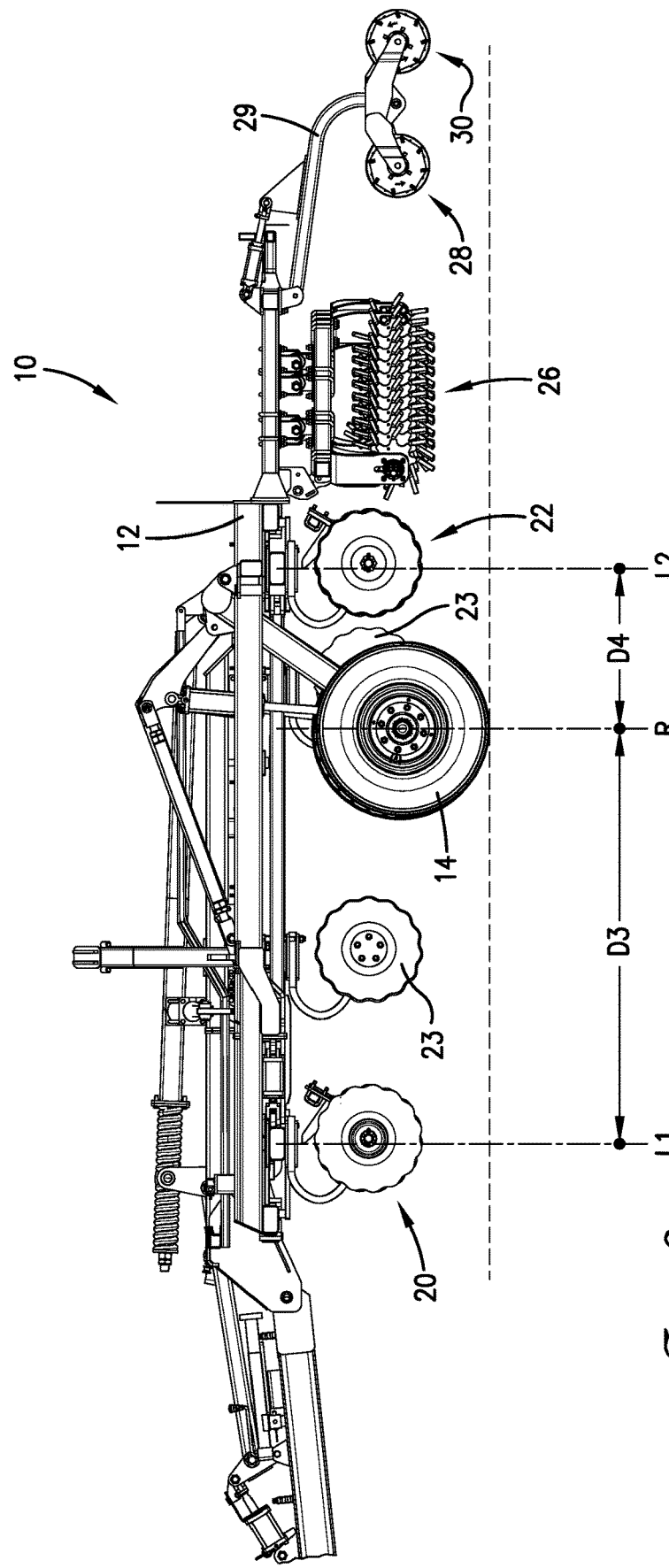
FIG. 3 is a side elevation view of the tillage implement from FIGS. 1 and 2, particularly illustrating the tillage implement in a transport configuration.
Figure 4:
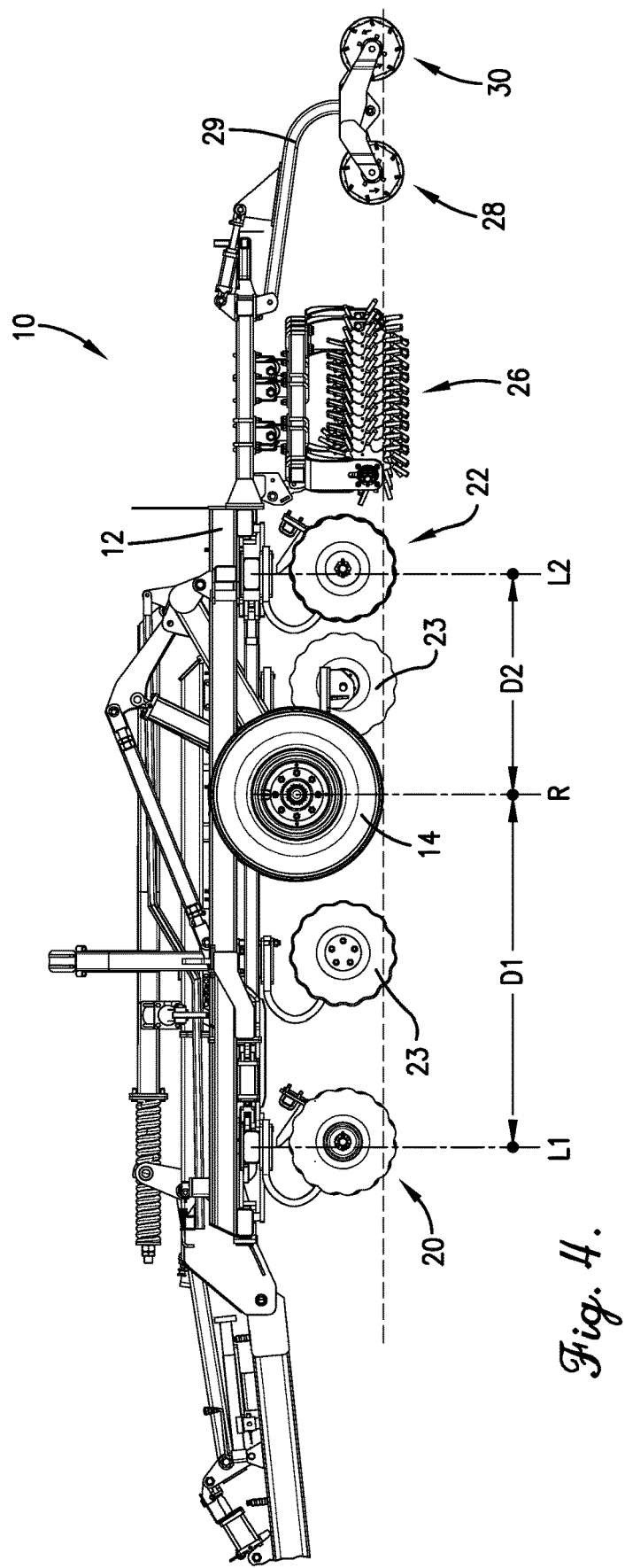
FIG. 4 is a side elevation view of the tillage implement from FIGS. 1 and 2, particularly illustrating the tillage implement in an operating configuration.

Turning now to the implement 10 in more detail, FIG. 3 illustrates the implement 10 in a transport configuration. In such a configuration, the wheels 14 are actuated downward away from the main frame 12, such that the main frame 12 and the ground-engaging tools are lifted upward away from the ground surface. In the transport configuration, the implement 10 can more easily be transported by the towing vehicle. In some embodiments, as will be described in more detail below, the lateral sides of the main frame 12 (and any associated ground-engaging tools) may be folded upward in a wing-like manner when in the transport configuration. FIG. 4, in contrast, illustrates the implement 10 in an operational configuration. Specifically, in such a configuration, the wheels 14 are actuated upward with respect to the main frame 12, such that the main frame 12 is lowered toward the ground surface, and the ground-engaging tools are engaged downward into the ground. In the operational configuration, the implement 10 can be pulled through a field or section of soil by the towing vehicle such that the ground-engaging tools can engage the soil to perform tilling operations.

Turning now to the components of the implement 10 that extend down from the main frame 12, the implement 10 may include a plurality and/or a set of wheels 14 arranged generally in a laterally extending row. The number of wheels 14 may vary depending on the size of the implement 10 and/or on the requirements of the tilling operations. However, as shown in the figures, the implement 10 may have six wheels 14, including four interior wheels 14 and two outer wheels 14. As noted previously, the wheels 14 are configured to support said main frame 12 above the ground surface. In addition, one or more of the wheels 14 may comprise depth-adjusting wheels that are actuatable by the hydraulic actuators 16 to transition the implement 10 between an operational configuration (e.g., FIG. 4) and a transport configuration (e.g., FIG. 3) and vice versa. It should be understood that the main frame 12 is positioned closer to the ground when in the operational configuration than in the transport configuration.

Turning to the soil-engaging tools, the implement 10 may include, as illustrated in FIGS. 1-6, a front group 20 of coulter blades carried by and extending down from the main frame 12. The front group 20 of coulter blades may extend generally laterally across main frame 12 of the implement 10. In some embodiments, the front group 20 of coulter blades may be configured as a plurality of individual gangs of coulter blades. For example, the implement 10 may include a front group 20 of coulter blades that comprises four individual gangs of coulter blades, as perhaps best shown in FIGS. 5 and 6. Each gang may comprise eight individual coulter blades. As used herein, the term "gang" refers to a group of ground-engaging tools that are linked together so as to be actuated as a unit.

In addition, the implement 10 may include a rear group 22 of coulter blades carried by and extending down from the main frame 12. The rear group 22 of coulter blades may extend generally laterally across the main frame 12 of the implement 10. The rear group 22 of coulter blades may be configured as a plurality of gangs of coulter blades. For example, the implement 10 may include a rear group 22 of coulter blades that comprises four individual gangs of coulter blades, as perhaps best shown in FIGS. 5 and 6. Each gang may comprise eight individual coulter blades.

The coulter blades may be configured as disc blades 24, as illustrated in FIGS. 7-9. The disc blades 24 may be in the form of concave discs. In some embodiments, the disc blades 24 may each have a shallow concavity. In more detail, common concave coulter disc blades may have a radius of curvature of between about twenty-six and thirty inches; whereas, the shallow concave disc blades 24 incorporated for use with embodiments of the present invention may have a radius of curvature of about thirty-six inches or more. In some embodiments, the disc blades 24 may each comprise a plurality of waves or fluted sections on circumferential portions of the disc blades 24. For example, each disc blade 24 may be formed with between ten and sixty waves/flutes, between twelve and fifty-five waves/flutes, between fifteen and fifty waves/flutes, or between twenty-four and forty-eight waves/flutes.

As noted above, each of the front and rear group 20, 22 of coulter blades may comprise a plurality of gangs of coulter blades. For instance, the front group 20 of coulter blades may include four front gangs, with each gang comprising eight coulter blades. Similarly, the rear group 22 of coulter blades may include four rear gangs, with each gang comprising eight coulter blades. However, it should be understood that the implement 10 may include any number of gangs, with each gang including any number of coulter blades. For example, in some embodiments, the implement may include between six to fourteen coulter blades on each gang. Each gang of coulter blades may comprise a support frame that is connected to and extends down from the main frame 12 and that rotatably supports its associated coulter blades such that each of the coulter blades can rotate about an individual rotational axis. As perhaps best shown in FIGS. 5 and 6, each of the gangs of coulter blades may be rotatable by a gang angle about a vertical, upright pivot axis 32. The pivot axis 32 of each gang of coulter blades may represent a connection point between the gang and the main frame 12.

The gangs of coulter blades may have their gang angles adjusted via an actuator 34, such as hydraulic cylinder, that extends between the main frame 12 and the gangs. In operation, the gangs of coulter blades may be oriented in a generally laterally-extending position (e.g., FIG. 5), such that the gangs extend generally laterally across the main frame 12 of the implement 10 (i.e., the gang angle formed between each gang and the lateral direction is equal to zero). In such an orientation, the coulter blades of each gang are disposed straight ahead, generally in parallel alignment with the travel direction of the implement 10. In contrast, the gangs of coulter blades can be shifted or rotated to an oblique position (e.g., FIG. 6) in which the gangs are orientated at an angle with respect to the lateral direction of the implement 10 (i.e., the gang angle formed between each gang and the lateral direction is greater than zero). In such an orientation, the coulter blades of each gang are disposed at an oblique angle with respect to the travel direction of the implement 10. It should be understood that the term "gang angle" refers to the angle formed between a gang and a lateral direction with respect to the implement 10. However, the gang angle will also approximate the angle formed between the individual coulter blades of the gang and the travel direction of the implement 10 (i.e., the longitudinal direction).

In view of the above, each of the gangs of the front and rear groups 20, 22 of coulter blades can be shifted and/or rotated (e.g., via the actuators 34) to any orientation between a minimum gang angle and a maximum gang angle. In some embodiments, the minimum gang angle (see e.g., FIG. 5) may be about zero degrees, may be less than one-half of one degree, may be less than one degree, may be less than one and one-half degree, or may be less than two degrees. In some embodiments, the maximum gang angle may be at least two degrees, may be at least four degrees, may be at least five degrees, may be at least five and one-half degrees, may be at least six degrees, may be at least six and one-half degrees, may be at least seven degrees, may be at least seven and one-half degrees, may be at least eight degrees, or may be at least eight and one-half degrees. It should be understood, however, that the gangs of coulter blades may be positioned at any gang angle between the minimum and maximum gang angles. Furthermore, in some embodiments, the minimum gang angle of the front gangs may be different than the minimum gang angle of the rear gangs. Similarly, in some embodiments, the maximum gang angle of the front gangs may be different than the maximum gang angle of the rear gangs.

Figure 5:
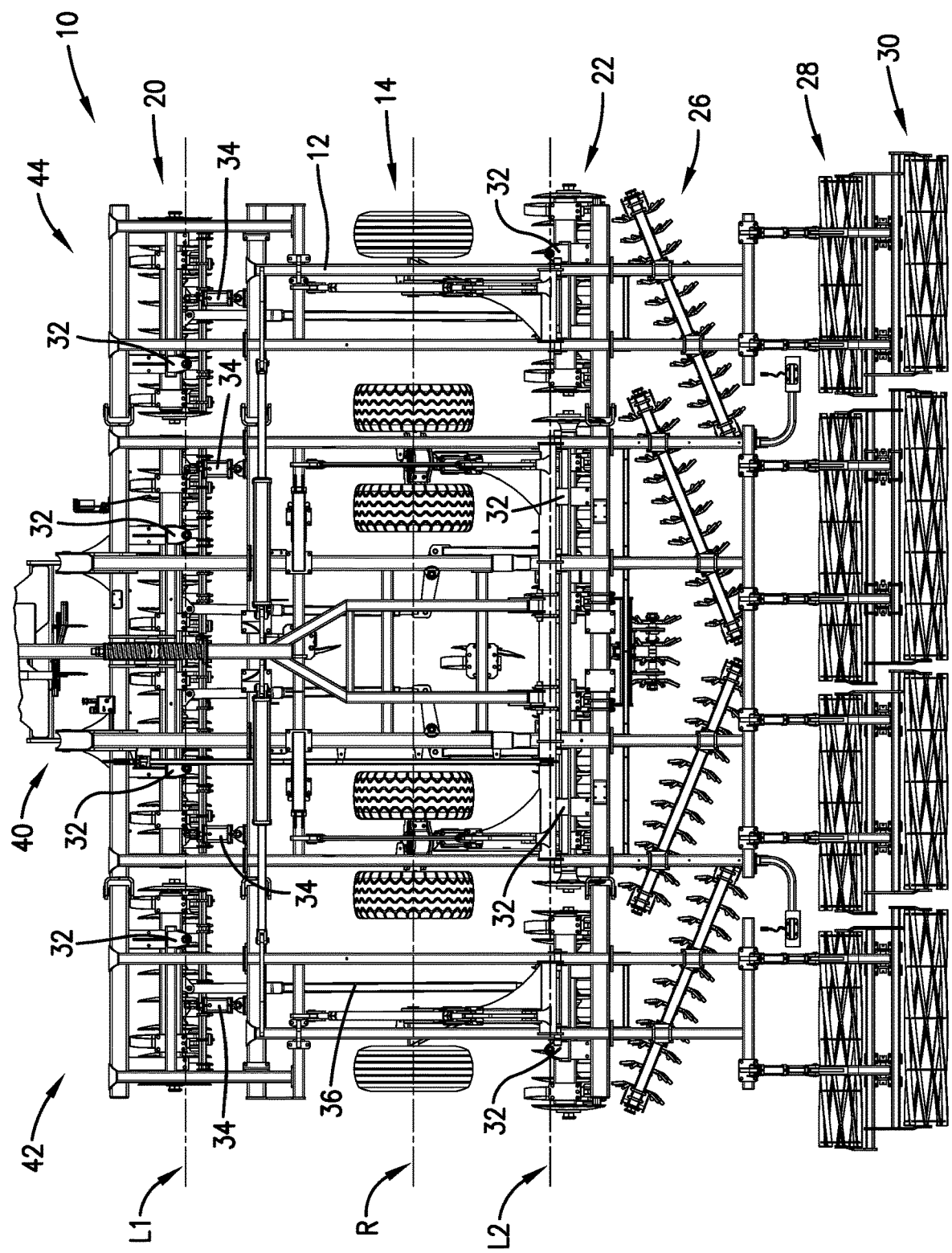
FIG. 5 is a top plan view of the tillage implement from FIGS. 1 and 2, particularly illustrating front and rear groups of coulter blades oriented at a minimum gang angle.
Figure 6:
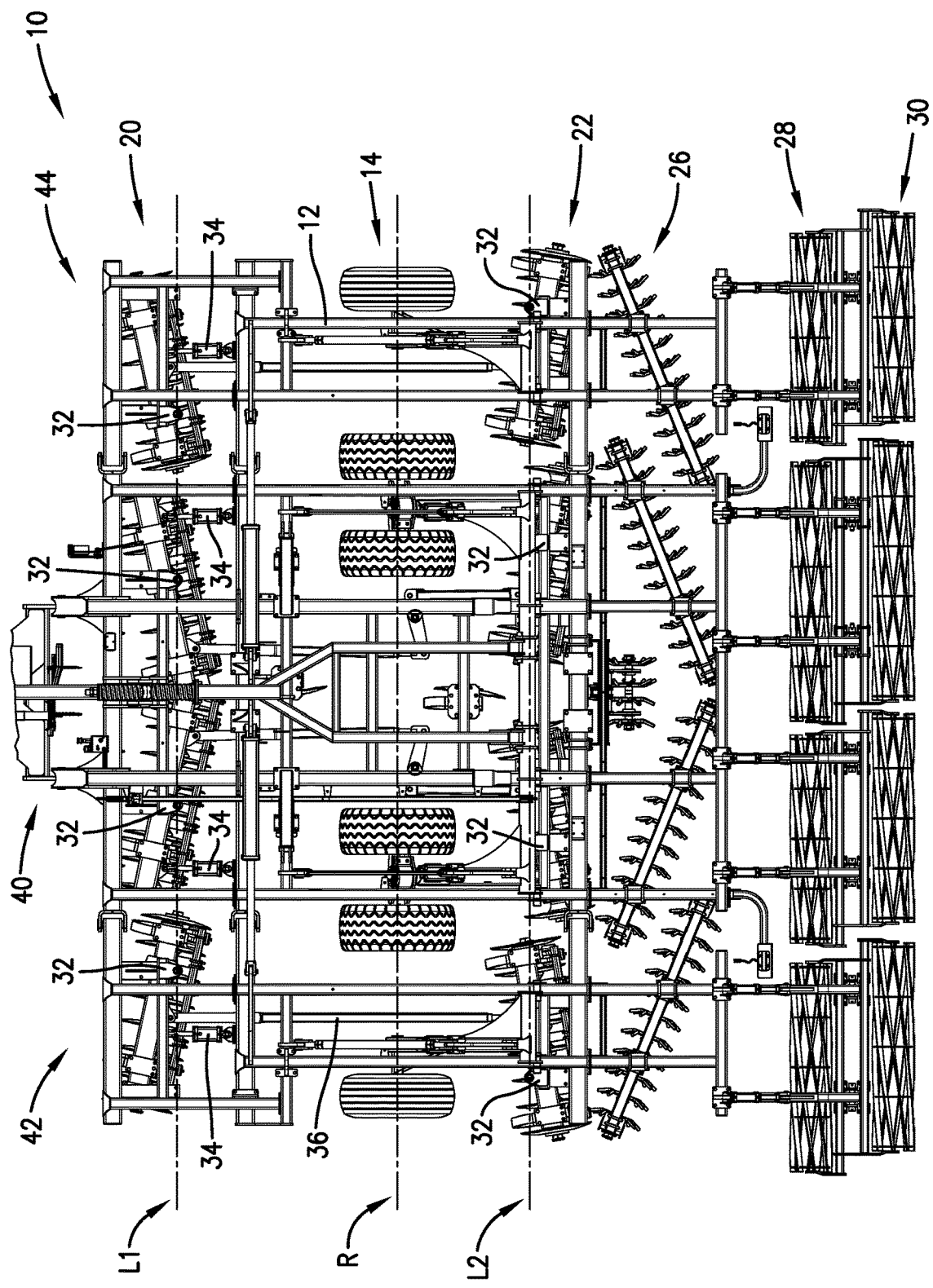
FIG. 6 is a top plan view of the tillage implement from FIGS. 1 and 2, particularly illustrating front and rear groups of coulter blades oriented at a maximum gang angle.

In some embodiments, as shown in FIGS. 5 and 6, the implement 10 may comprise a mechanical linkage 36 that couples the front and rear gangs of coulter blades to one another in a manner such that a gang angle adjustment of one of said front and rear gangs of coulter blades will causes a gang angle adjustment of the other of said front and rear gangs of coulter blades. For example, the rear gangs of coulter blades may be coupled with the front gangs of coulter blades via the mechanical linkage 36, such that the rear gang of coulter blades can be rotated in response to the rotation of the front gang of coulter blades (as perhaps caused by the actuators 34). In more detail, the actuators 34 may shift the front gangs of coulter blades from the minimum gang angle (e.g., FIG. 5) of the front gangs to the maximum gang angle (e.g., FIG. 6) of the front gangs. During such actuation, the mechanical linkage 36 may cause the rear gangs of coulter blades to also shift from the minimum gang angle (e.g., FIG. 5) of the rear gangs to the maximum gang angle (e.g., FIG. 6) of the rear gangs.

In certain embodiments, the mechanical linkage 36 may cause the rear gangs to rotate generally at the same magnitude as the front gangs. In such embodiments, for example, the front and rear gangs may rotate simultaneously between the same minimum and maximum gang angles. In other embodiments, the mechanical linkage 36 may cause the rear gangs to rotate by a different magnitude than the front gangs. In some of such embodiments, the magnitude of rotation of the rear gangs may be proportional to the magnitude of rotation of the front gangs. However, such proportionality is not required. As an example, in some embodiments, the mechanical linkage 36 may cause the rear gangs to rotate between a minimum gang angle of about zero degrees and a maximum gang angle of about six degrees, in response to the front gangs rotating between a minimum gang angle of about zero degrees and a maximum gang angle of about eight degrees.

Generally, embodiments provide for the front gangs of coulter blades to be rotated in an opposite direction as the rear gangs (as perhaps caused by the manner in which the mechanical linkage 36 couples the front and rear gangs). For instance, as shown in FIG. 6, the front gangs of coulter blades may be rotated in a manner to permit interior ends of the front gangs to be positioned more rearward than exterior ends (it being understood that the interior ends are the ends that are positioned closer to a longitudinal centerline of the implement 10 than the exterior ends). In contrast, the rear gangs of coulter blades may be rotated in a manner to permit exterior ends of the rear gangs to be positioned more rearward than interior ends.

In operation, with the implement 10 lowered to the operating configuration with the ground-engaging tools engaged down into the ground, the front and rear groups 20, 22 of coulter blades will be propelled through the ground, such that the individual coulter blades will cut into the soil. When the gangs of coulter blades are positioned at the minimum gang angle, the coulter blades are configured for vertical tilling to form generally narrow strips of tilled soil. Such vertical tilling may commonly be used in the spring season ahead of a planter. As such, the gangs of coulter blades can cut plant residue left over from the previous fall season harvest and can prepare an excellent seed bed. In contrast, when the gangs of coulter blades are shifted to the maximum gang angle, the coulter blades are configured to aggressively lift and move soil laterally (e.g., to cover and incorporate plant residue). Such aggressive tilling may commonly be used in the fall season for residue management work.

In some embodiments, the implement 10 may include other individual coulter blades that extend down from the main frame 12 of the implement 10. For example, as shown in FIGS. 1-4, the implement 10 may include one or more individual, centrally positioned breaker discs 23 that function as middle breaker discs to break up soil that passes beneath a center of the implement 10, between the front and/or rear groups 20, 22 of coulter blades. Specifically, one breaker disc 23 may be positioned between the front group 20 of coulter blades and the wheels 14, and another breaker disc 23 may be positioned between the wheels 14 and the rear group 22 of coulter blades. It should also be understood that, however, the individual breaker discs 23 are not considered part of and/or otherwise associated with the front and/or rear groups 20, 22 of coulter blades.

As shown in FIGS. 1-6, the implement 10 may additionally comprise ground-engaging tools in the form of a group of harrow assemblies 26 carried by and extending down from the main frame 12. The group of harrow assemblies 26 of may extend generally laterally across the implement 10. The group of harrow assemblies 26 may be configured as a plurality of gangs of harrows elements. For example, the implement 10 may include a group of harrow assemblies 26 that comprises four individual gangs of harrow elements, as perhaps best shown in FIGS. 5 and 6. In such embodiments, each gang of harrow elements may include eleven individual harrow elements. In some embodiments, the harrow elements may comprise rolling harrows, with each harrow element comprising a hub and a plurality of individual spikes or tines extending radially from the hub (e.g., a starwheel or a spiked harrow), such as the spike wheels illustrated in commonly-owned U.S. Pat. No. 7,325,623, which is incorporated herein by reference in its entirety. In other embodiments, the individual harrow elements may comprise chopper wheels as illustrated in commonly-owned U.S. Pat. No. 8,714,276, which is incorporated herein by reference in its entirety. As such, the group of harrow assemblies 26 may comprise a group of rolling harrow assemblies. Each gang of harrow elements may comprise a support frame that extends down from the main frame 12 and that rotatably supports its harrow elements such that the harrow elements can rotate about an individual rotational axes (e.g., as perhaps defined by the hub of the harrow element). In other embodiments, the harrow elements may comprise disc harrows, non-rotating tine harrows, chain harrows, or chain-disk harrows.

In some embodiments, the gangs of harrow elements may be orientated at a gang angle with respect to the lateral direction of the implement 10. In some embodiments, the gang angle of the gangs of harrow elements may be at least ten degrees, at least fifteen degrees, at least twenty degrees, at least twenty-two and one-half degrees, at least twenty-five degrees, or at least thirty degrees. The gang angle of the gangs of harrow elements may be between ten and thirty degrees, between fifteen and twenty-five degrees, or about twenty-two and one-half degrees. In some embodiments, the gang angle of the individual gangs of harrow elements may be adjusted by shifting the position at which the support frames of the gangs are attached to the main frame 12. It should be understood that although the term "gang angle" refers to the angle formed between a gang of harrow elements and the lateral direction of the implement 10, the gang angle will also approximate the angle formed between the associated harrow elements of the gang and the travel direction of the implement 10.

In view of the above, and with the implement 10 lowered to the operating configuration with the ground-engaging tools engaged down within the ground, the group of harrow assemblies 26 is configured to be propelled through the ground to mix the soil. For instance, the harrow elements of the group of harrow assemblies 26 may be used to (i) bring residue within the soil to the surface of the soil, (ii) tear up weeds, grass, and other crop residue, and/or (iii) assist with soil aeration.

The implement 10 may additionally include a front group 28 of finishing reels carried by and extending down from the main frame 12. In some embodiments, the finishing reels may be supported by a subframe 29 (see FIGS. 1 and 2) that extends rearward from the main frame 12. In certain embodiments, the subframe 29 may form part of the main frame 12. Regardless, the front group 28 of finishing reels may extend generally laterally across the main frame 12 of the implement 10. The front group 28 of finishing reels may be configured as a plurality of reel assemblies. For example, the implement 10 may include the front group 28 of finishing reels that comprises four individual reel assemblies, as perhaps best shown in FIGS. 5 and 6. The reel assemblies may comprise rotatable baskets, such as knife edge baskets that include a plurality of elongated, circumferentially spaced knife blades or flat bars held together via a plurality of hubs or plates. In other embodiments, the baskets may comprise round bars in place of knife blades.

In addition, the implement 10 may include a rear group 30 of finishing reels carried by and extending down from the main frame 12. In some embodiments, the finishing reels may be supported by the subframe 29. For example, as illustrated in FIGS. 3 and 4, each of the front and rear groups 28, 30 of reel assemblies may be supported by subframe 29 that is itself supported by and extends rearward from the main frame 12. However, in other embodiments, the subframe may form part of the main frame 12. Regardless, the rear group 30 of finishing reels may extend generally laterally across the main frame 12 of the implement 10. The rear group 30 of finishing reels may be configured as a plurality of reel assemblies. For example, the implement 10 may include the rear group 30 of finishing reels that comprises four individual reel assemblies, as perhaps best shown in FIGS. 5 and 6. The reel assemblies may comprise rotatable baskets, such as a knife edge baskets that include a plurality of elongated, circumferentially spaced knife blades or flat bars held together via a plurality of hubs or plates. In other embodiments, the baskets may comprise round bars in place of knife blades.

In still further embodiments, one or more of the finishing reel assemblies of the implement 10 may include reel-drums. Such reel-drums may comprise cylindrical drums that extends along a length of the relevant assembly. In some embodiments, the reel-drums may include protrusions that extend from the circumferential surface of the drums. Such protrusions may be configured as rings of protrusions, with the individual rings being spaced apart along the length of the drums. In some specific embodiments, the front group 28 of reel assemblies may comprise reel-drums, whereas the rear group 30 of reel assemblies may comprise baskets. However, embodiments may include other configurations, such as the rear group 30 of reel assemblies comprising reel-drums and the front group 28 of reel assemblies comprising baskets. In still further embodiments, both the front and rear groups 28, 30 of reel assemblies may comprise reel-drums.

In view of the above, and with the implement 10 lowered to the operating configuration with the ground-engaging tools engaged down within the ground, the front and rear groups 28, 30 of reel assemblies may be propelled through the ground to level out the tops surface of the soil. For example, the reel assemblies may assist leveling the soil and residue by laying over any standing residue, helping to pin residue into the soil, and breaking up clods and mixing the soil.

As perhaps best shown in FIGS. 3 and 4, the front group 20 of coulter blades may be positioned near a front end of the main frame 12 of the implement 10. For example, the front group 20 of coulter blades may be positioned no more than thirty-six inches, no more than thirty inches, no more than twenty-four inches, or no more than eighteen inches from the front end of the main frame. The rear group 22 of coulter blades may be positioned rearward or behind the front group 20 of coulter blades with respect to the travel direction of the implement 10. The set of wheels 14 may be positioned generally between the front group 20 of coulter blades and the rear group 22 of coulter blades. The group of harrow assemblies 26 may be positioned behind or rearward of the rear group 22 of coulter blades. The front group of finishing reels 28 may be positioned rearward of the group of harrow assemblies 26. And finally, the rear group of finishing reels 30 may be positioned rearward of the front group of finishing reels 28.

As was described above, the implement 10 is shiftable (via movement of the wheels 14 with respect the main frame 12, such as may be caused by the actuators 16) between an operating configuration and a transport configuration. In the operating configuration (e.g., FIG.), the main frame 12 is positioned closer to the ground surface than when in the transport configuration (e.g., FIG. 3). As such, when in the operating configuration, the ground-engaging tools can be embedded down into the ground. Embodiments of the present invention provide for the set of wheels 14 of the implement 10 to be positioned closer to the rear group 22 of coulter blades than the front group 20 of coulter blades regardless of whether the implement 10 is in the operating configuration or the transport configuration.

In more detail, and with reference to FIGS. 5 and 6, a theoretical line "L1" extends generally laterally between two rearmost upright pivot axes 32 of the front gangs of coulter blades (i.e., of the front group 20 of coulter blades). It should be noted that the line "L1" extends through each of the upright pivot axes 32 of the front gangs of coulter blades if such upright pivot axes 32 are all laterally aligned, as is illustrated in FIGS. 5 and 6. Similarly, a theoretical line "L2" extends generally laterally between two forwardmost upright pivot axes 32 of the rear gangs of coulter blades (i.e., of the rear group 22 of coulter blades. It should be noted that the line "L2" extends through each of the upright pivot axes 32 of the rear gangs of coulter blades if such upright pivot axes 32 are all laterally aligned. A rotational axis "R" of a forwardmost wheel 14 of the set of wheels 14 extends generally laterally with respect to the implement 10, as is illustrated in FIGS. 5 and 6. In some embodiments (such as when the rotational axes of the all the wheels 14 of the set of wheels 14 are aligned), the rotational axis "R" will extend through (or will comprise) the rotational axis of all the wheels 14. Regardless, and with reference to FIGS. 3 and 4, the rotational axis "R" of a forwardmost wheel 14 from the set of wheels 14 is positioned closer to the line "L2" than the line "L1," regardless of whether the implement 10 is in the operating configuration or the transport configuration.

In more detail, and remaining with FIG. 4, when the implement 10 is in the operating configuration, a distance "D1" is presented between the rotational axis "R" of the forwardmost wheel 14 of the set of wheels 14 and the line "L1." A distance "D2" is presented between the rotational axis "R" of the forwardmost wheel 14 of said set of wheels 14 and the line "L2." A ratio of "D2" to "D1" is in the range of 1:1.2 to 1:1.7, 1:1.3 to 1:1.6, 1:1.4 to 1:1.55, or about 1:1.5. For example, "D2" may be about forty-two inches, and "D1" may be about sixty-five inches. Turning to FIG. 3, when the implement 10 is in the transport configuration, a distance "D3" is presented between the rotational axis "R" of the forwardmost wheel 14 of the set of wheels 14 and the line "L1." A distance "D4" is presented between the rotational axis "R" of the forwardmost wheel 14 of said set of wheels 14 and the line "L2." A ratio of "D4" to "D3" is in the range of 1:2.0 to 1:3.0, 1:2.25 to 1:2.75, or about 1:2.5. For example, "D4" may be about thirty-one inches, and "D3" may be about seventy-six inches. Such a relative rearward positioning of the wheels 14 on the main frame 12 (perhaps in conjunction with the positioning of the front group 20 of coulter blades on the front of the frame 12) provides for an enhancement in the forces applied and/or experience by the hitch tongue 17, particularly when incorporating the double rows (i.e., front and rear groups 28, 30)

of finishing reels. Such improvement in tongue weight can be beneficial for transportation, steering, and general operation of the implement 10.

In operation, the above described implement 10 may be pulled in a travel direction through a section of soil to performing tilling operations on the soil. As was noted previously, the implement 10 may be pulled by a tow vehicle, such as a tractor. During such a tilling operations, the implement 10 will be positioned in the operating configuration (see, e.g., FIG. 4), such that the ground-engaging tools are lowered into engagement with the ground. As such, the implement 10 may initially cut into the section of soil using a first gang of coulter blades positioned adjacent to a front end of the implement. Such a first gang of coulter blades that may be part of the front group 20 of coulter blades. Due to the position of the front group 20 of coulter blades at the front of the main frame 12, coulter blades of the front group 20 of coulter blades will be the first ground-engaging tools of the implement 10 to make contact with the section of soil. Next, the implement 10 may cut into the section of soil using a second gang of coulter blades. Such a second gang of coulter blades may be part of the rear group 22 of coulter blades. As such, the second gang of coulter blades will be positioned rearward of the first gang of coulter blades. As used herein, the term "cut" or "cutting" when referencing the coulter blades may refer to manipulating the soil by cutting and turning the soil and/or cutting and rolling the soil. Particularly, the coulter blades are configured to cut into the soil and then lift the soil as the blades leave the soil, thereby causing the soil to roll over and mix. Much of the fracturing and mixing of soil and residue provided by the implement 10 occurs at the coulter blades ahead of the harrow assemblies.

Furthermore, the set of wheels 14 supporting the implement 10 on the ground will be positioned rearward of the first gang of coulter blades and forward of the second gang of coulter blades. Next, the implement 10 may continue to fracture and mix the section of soil using a set of harrow assemblies 26, such as rolling harrow assemblies, which are positioned rearward of the second gang of coulter blades. In addition to performing mixing of the soil, the rolling harrow assemblies are configured to begin leveling the soil. Next, the implement 10 may further level and finish the section of soil using a first set of finishing reels 28 positioned rearward of the set of harrow assemblies 26. Finally, the implement may further level the section of soil using a second set of finishing reels 30 positioned rearward of the first set of finishing reels 28. It should be understood that the sequential actions (i.e., cutting, cutting, mixing, levelling, and levelling) may be performed in the order outlined above given the positioning of the ground-engaging tools on the implement 10. Furthermore, there may be some cross over between the actions performed by the ground-engaging tools. For example, the rolling harrow assemblies may perform mixing actions (as with the coulter blades) and levelling actions (as with the finishing reels).

During such tilling operations, in some embodiments, the first gangs of coulter blades (from the front group 20 of coulter blades) may be positioned at a first gang angle of at least two degrees, at least four degrees, at least five degrees, at least six degrees, at least six and one-half degrees, at least seven degrees, at least seven and one-half degrees, at least eight degrees, or at least eight and one-half degrees. In some specific embodiments, the first gang angle may be set at a maximum gang angle of about eight degrees. However, in other embodiments, the first gang angle may be set to a minimum gang angle of about zero degrees. The second gangs of coulter blades (from the front group 20 of coulter blades) may be positioned at a second gang angle of at least two degrees, at least four degrees, at least five degrees, at least six degrees, at least six and one-half degrees, or at least seven degrees, at least seven and one-half degrees, at least eight degrees, or at least eight and one-half degrees. In some specific embodiments, the second gang angle may be set at a maximum gang angle of about six degrees. However, in other embodiments, the second gang angle may be set to a minimum gang angle of about zero degrees.

In some embodiments, a linear actuator (e.g., actuator 34) may be used to change the gang angle of at least one of the first and/or second gangs of coulter blades. However, in some embodiments, the shifting of one of the first and second gangs of coulter blades will cause a corresponding shifting of the other of the first and second gangs of coulter blades, such as via the mechanical linkage 36 extending between the first and second gangs of coulter blades. For example, in some embodiments, the second gang angle will be approximately equal to the first gang angle. In other embodiments, the second gang angle will be proportional to the first gang angle. In still other embodiments, the second gang angle will be independent of the first gang angle.

Beneficially, embodiments of the present invention provide for the front and rear groups 20, 22 of coulter blades to aggressively move soil (e.g., when positioned at their respective maximum gang angles) at the front part of the implement 10, in order to have a desirable seedbed for planting (i.e., by fracturing the soil and mixing soil and residue). However, the use of the harrow assemblies 26 and double reels (i.e., front and rear finishing reels 28, 30) rearward of the coulter blades functions to perform a final smoothing and firming of the soil to create a preferable seedbed. Thus, embodiments provides for a combination of (i) the double sets (e.g., rows) of coulter blades to fracture and mix the soil and residue, (ii) the rolling harrow assemblies to perform preliminary leveling of the soil, and (iii) the double sets (e.g., rows) of finishing reels to perform the final smoothing and firming of the soil/seedbed.

Once the tilling operations have been completed, the implement 10 may be shifted from the operating configuration to the transport configuration, as shown in FIG. 3. In such a configuration, the ground-engaging tools are raised above the ground surface, which can be beneficial when transporting the implement 10. To further aid in transporting the implement 10, the main frame 12 may, in some embodiments, comprise a central section 40, a left wing section 42, and a right wing section 44, as illustrated in FIGS. 5 and 6. In such embodiments, the left and right wing sections 42, 44 are configured to pivot upward/downward with respect to the central section 40. When in the operating position, the left and right wing sections 42, 44 will generally be orientated in parallel relationship with the central section 40 (i.e., orientated generally horizontally). However, in the transport configuration, the left and right wing sections 42, 44 may be rotated upward in a generally perpendicular orientation with respect to the central section 40. In more detail, each of the left and right wing sections 42, 44 may be configured to support at least a portion of the implement's 10 ground-engaging tools (e.g., the front and rear groups 20, 22 of coulter blades, the set of wheels 14, the group of harrow assemblies 26, and the front and rear groups of finishing reels 28, 30), such that upon the left and right wing sections 42, 44 being pivoted upward with respect to said central section 40, respective portions of the ground-engaging tools are also folded upward, such that the overall width of the implement is reduced for more efficient transport.

It should be understood, however, that embodiments of the present invention may be used on frames other than the three-section frame discussed above (i.e., a central section, a left wing section, and a right wing section). For example, embodiments of the present invention may be used with a five-section frame, which may include a central section, an outer left wing section, an inner left wing section, an outer right wing section, and an inner right wing section. In such embodiments, the outer wing sections may fold upward about ninety degrees with respect to the inner wing sections. Similarly, the inner wing sections may fold upward about ninety degrees with respect to the central section. As such, in a folded configuration, the outer wing sections are eventually orientated upside down. In still other embodiments, the outer wing sections may be rotated about one-hundred eighty degrees, such that upon the inner wing sections being rotated ninety degrees, the outer wing sections are orientated vertically, adjacent to the inner wing sections. In some other embodiments, the frame may simply comprise a foldable central section, such that the left and right sides (i.e., halves of the frame) may fold upward about a split in the central section. In still further embodiments, some frames may be configured to fold forwards and rotate wing sections upwards ninety degrees such that the fronts of the wing sections are facing down, the bottoms are facing out, and the wing sections are generally parallel with the direction of travel.

Having thus described one or more embodiments of the invention, what is claimed as new and desired to be protected by Letters Patent includes the following:

What is claimed is:

1. A tillage implement comprising:
   a main frame;
   a front group of coulter blades carried by said main frame and extending generally laterally across said tillage implement, wherein said front group of coulter blades is rotatable with respect to said main frame on an upright pivot axis;
   a rear group of coulter blades carried by said main frame and extending generally laterally, wherein said rear group of coulter blades is rotatable with respect to said main frame on an upright pivot axis;
   a set of wheels configured to support said main frame on a ground surface, wherein said set of wheels is positioned generally between said front and rear groups of coulter blades, wherein said set of wheels includes one or more actuatable depth adjustment wheels for adjusting a height of said main frame with respect to the ground surface, such that said tillage implement is shiftable between an operating configuration and a transport configuration, wherein said main frame of said tillage implement is positioned closer to the ground surface in the operating configuration than in the transport configuration,
   wherein when said tillage implement is in either the operating configuration or the transport configuration said set of wheels is positioned closer to the upright pivot axis of said rear group of coulter blades than the upright pivot axis of said front group of coulter blades;
   a group of harrow assemblies carried by said main frame and positioned rearward of said rear group of coulter blades;
   a front group of finishing reels carried by said main frame, extending generally laterally, and positioned rearward of said group of harrow assemblies; and
   a rear group of finishing reels carried by said main frame, extending generally laterally, and positioned rearward of said front group of finishing reels.

2. The tillage implement of claim 1, wherein said front group of coulter blades comprises a plurality of front coulter gangs, wherein said rear group of coulter blades comprises a plurality of rear coulter gangs, wherein each front and rear coulter gang is rotatable with respect to said main frame on a respective upright pivot axis between a minimum gang angle of less than 1 degree and a maximum gang angle of at least 6 degrees.

3. The tillage implement of claim 2, further comprising a mechanical linkage system coupling said front coulter gangs and said rear coulter gangs in a manner such that rotation of one of said front and rear coulter gangs causes rotation of the other of said front and rear coulter gangs.

4. The tillage implement of claim 1, wherein said coulter blades of said front and rear groups of coulter blades comprise concave discs.

5. The tillage implement of claim 4, wherein said concave discs are each formed with a shallow concavity.

6. The tillage implement of claim 1, wherein said front group of coulter blades are included as part of a plurality of front coulter gangs and said rear group of coulter blades are included as part of a plurality of rear coulter gangs, wherein each of said front coulter gangs rotates with respect to said main frame about a respective upright pivot axis and each of said rear coulter gangs rotates with respect to said main frame about a respective upright pivot axis, wherein a theoretical line L1 extends generally laterally between two rearmost upright pivot axes of the front coulter gangs and a theoretical line L2 extends generally laterally between two forwardmost upright pivot axes of the rear coulter gangs, and wherein a rotational axis of a forwardmost wheel from the set of wheels is positioned closer to the line L2 than the line L1 when said tillage implement is in both the operating configuration and the transport configuration.

7. The tillage implement of claim 6, wherein when said tillage implement is in the operating configuration a distance D1 is presented between the rotational axis of the forwardmost wheel of said set of wheels and the line L1, wherein a distance D2 is presented between the rotational axis of the forwardmost wheel of said set of wheels and the line L2, and wherein a ratio of D2 to D1 is in the range of 1:1.2 to 1:1.7.

8. The tillage implement of claim 1, wherein said group of harrow assemblies comprises a plurality of rolling harrow assemblies each comprising one or more rolling spiked harrows, wherein each of said rolling harrow assemblies is angled by at least 10 degrees with respect to a lateral direction relative to said tillage implement.

9. The tillage implement of claim 1, wherein said front and rear groups of finishing reels each comprises a plurality of finishing reel baskets.

10. The tillage implement of claim 1, wherein said main frame comprises a central section, a left wing section, and a right wing section, and wherein said left and right wing sections are configured to pivot with respect to said central section.

11. The tillage implement of claim 10, wherein each of said left and right wing sections is configured to support at least a portion of said front and rear groups of coulter blades, said set of wheels, said group of harrow assemblies, and said front and rear groups of finishing reels, such that upon said left and right wing sections being pivoted upward with respect to said central section, respective portions of said front and rear groups of coulter blades, said set of wheels, said group of harrow assemblies, and said front and rear groups of finishing reels are folded upward for transport of said tillage implement.

12. A tillage implement comprising:
a main frame;
a first gang of coulter blades carried by said main frame, wherein said first gang of coulter blades is configured to rotate about an upright pivot axis between a minimum gang angle and a maximum gang angle, wherein said minimum gang angle is less than 2 degrees and said maximum gang angle is at least 7 degrees;
a second gang of coulter blades carried by said main frame configured to rotate about an upright pivot axis between a minimum gang angle and a maximum gang angle, with the minimum gang angle being less than 2 degrees and the maximum gang angle being at least 5 degrees;
a set of wheels configured to support said main frame on a ground surface, wherein at least one of the wheels of said set of wheels is positioned rearward of said first gang of coulter blades and forward of said second gang of coulter blades,
wherein said set of wheels includes one or more actuatable depth adjustment wheels for adjusting a height of said main frame with respect to the ground surface, such that said tillage implement is shiftable between an operating configuration and a transport configuration, wherein said main frame of said tillage implement is positioned closer to the ground surface in the operating configuration than in the transport configuration,
wherein when said tillage implement is in either the operating configuration or the transport configuration said set of wheels is positioned closer to the upright pivot axis of said second gang of coulter blades than the upright pivot axis of said first gang of coulter blades;
a set of rolling harrow assemblies carried by said main frame and positioned rearward of said second gang of coulter blades; and
a plurality of rear finishing reels carried by said main frame and positioned rearward of said set of rolling harrow assemblies.

13. The tillage implement of claim 12, wherein said group of harrow assemblies comprises a plurality of rolling harrow assemblies each comprising one or more rolling spiked harrows, wherein each of said rolling harrow assemblies is angled by at least 10 degrees with respect to a lateral direction relative to said tillage implement.

14. The tillage implement of claim 12, wherein the minimum gang angle of the first gang of coulter blades and the second gang of coulter blades is less than 0.5 degrees, wherein the maximum gang angle of the first gang of coulter blades is at least 7.5 degrees, wherein said group of harrow assemblies comprises a plurality of rolling harrow assemblies, and wherein each of said rolling harrow assemblies is angled by at least 15 degrees with respect to a lateral direction relative to said tillage implement.

15. The tillage implement of claim 14, further comprising a plurality of front finishing reels carried by said main frame, extending generally laterally, and positioned in front of said rear finishing reels.

16. The tillage implement of claim 15, further comprising a sub frame extending from said main frame and configured to support both said front and rear finishing reels.

17. A tillage implement comprising:
a main frame;
a front gang of coulter blades carried by said main frame, wherein said front gang of coulter blades is configured to rotate about an upright pivot axis between minimum and maximum gang angles measured with respect to a lateral direction relative to said tillage implement;
a rear gang of coulter blades carried by said main frame, wherein said rear gang of coulter blades is configured to rotate about an upright pivot axis;
a set of wheels positioned generally behind said front gang of coulter blades, in front of said rear gang of coulter blades, and configured to support said main frame on a ground surface,
wherein said set of wheels includes one or more actuatable depth adjustment wheels for adjusting a height of said main frame with respect to the ground surface, such that said tillage implement is shiftable between an operating configuration and a transport configuration, wherein said main frame of said tillage implement is positioned closer to the ground surface in the operating configuration than in the transport configuration,
wherein when said tillage implement is in either the operating configuration or the transport configuration said set of wheels is positioned closer to the upright pivot axis of said rear gang of coulter blades than the upright pivot axis of said front gang of coulter blades;
a plurality of rolling harrow elements positioned generally behind said set of wheels, wherein each harrow element is angled by at least 15 degrees with respect to the travel direction of said tillage implement;
a front finishing reel carried by said main frame and positioned generally behind said plurality of rolling harrow elements; and
a rear finishing reel carried by said main frame and positioned generally behind said front finishing reel.

18. The tillage implement of claim 17, wherein the minimum gang angle is less than 2 degrees and the maximum gang angle is least 6 degrees.

19. The tillage implement of claim 18, wherein said rear gang of coulter blades is configured to rotate between a minimum gang angle and a maximum gang angle, with the minimum gang angle being less than 2 degrees and the maximum gang angle being at least 6 degrees.

20. The tillage implement of claim 19, further comprising a mechanical linkage coupling said front and rear gangs of coulter blades to one another in a manner such that gang angle adjustment of one of said front and rear gangs of coulter blades causes a gang angle adjustment of the other of said front and rear gangs of coulter blades.

21. The tillage implement of claim 17, wherein said minimum gang angle is less than 0.5 degrees and said maximum gang angle is least 7.5 degrees, wherein each rolling harrow element is angled by at least 20 degrees with respect to the travel direction of said tillage implement.

22. A method of tilling soil using a tillage implement, said method comprising the steps of:
(a) pulling the tillage implement comprising a main frame through a section of soil in a travel direction;
(b) cutting into the section of soil using a first gang of coulter blades positioned adjacent to a front end of the tillage implement, wherein the first gang of coulter blades is rotatable with respect to the main frame on an upright pivot axis;
(c) cutting into the section of soil using a second gang of coulter blades, wherein the second gang of coulter blades is rotatable with respect to the main frame on an upright pivot axis, wherein the second gang of coulter blades is positioned rearward of the first gang of coulter blades, and wherein a set of wheels supporting the tillage implement on a ground surface is positioned rearward of the first gang of coulter blades and forward of the second gang of coulter blades, wherein the set of wheels includes one or more actuatable depth adjustment wheels for adjusting a height of the main frame with respect to the ground surface, such that the tillage implement is shiftable between an operating configuration and a transport configuration, wherein the main frame of the tillage implement is positioned closer to the ground surface in the operating configuration than in the transport configuration, wherein when the tillage implement is in either the operating configuration or the transport configuration the set of wheels is positioned closer to the upright pivot axis of the second gang of coulter blades than the upright pivot axis of the first gang of coulter blades;

(d) mixing the section of soil using a set of rolling harrow assemblies positioned rearward of the second gang of coulter blades;

(e) levelling the section of soil using a first set of finishing reels positioned rearward of the set of rolling harrow assemblies; and (f) levelling the section of soil using a second set of finishing reels positioned rearward of the first set of finishing reels.

23. The method of claim 22, wherein during said cutting of step (b) said first gang of coulter blades is positioned at a first gang angle of at least 2 degrees, wherein during said cutting of step (c) said second gang of coulter blades is positioned at a second gang angle approximately equal to said first gang angle, wherein during said mixing of step (d) said rolling harrow assemblies are positioned at a third gang angle of at least 10 degrees, wherein the first, second, and third gang angles are measured relative to a lateral direction with respect to the tillage implement.

24. The method of claim 23, wherein the first and second gang angles are at least 6 degrees and wherein said third gang angle is at least 20 degrees.

25. The method of claim 23, further comprising, activating a linear actuator to thereby change the gang angle one of the first and second gangs of coulter blades, wherein said shifting of the one of the first and second gangs of coulter blades causes corresponding shifting of the other of the first and second gangs of coulter blades via a mechanical linkage extending between the first and second gangs of coulter blades.

26. The method of claim 23, wherein during said cutting of step (b) said first gang of coulter blades is positioned at a first gang angle of about 8 degrees, and wherein during said cutting of step (c) said second gang of coulter blades is positioned at a second gang angle of about 6 degrees.

* * * * *